United States Patent [19]

Barnes

[11] 4,226,676

[45] Oct. 7, 1980

[54] LIQUID METAL COOLED NUCLEAR REACTORS

[75] Inventor: Sidney Barnes, Grappenhall, England

[73] Assignee: Nuclear Power Company Limited, London, England

[21] Appl. No.: 907,350

[22] Filed: May 18, 1978

[30] Foreign Application Priority Data

Jun. 3, 1977 [GB] United Kingdom .............. 23754/77

[51] Int. Cl.$^2$ .............................................. G21C 9/00
[52] U.S. Cl. ...................................... 176/38; 52/410;
176/19 R; 176/DIG. 2
[58] Field of Search ...................... 176/65, 38, 37, 40,
176/87, DIG. 2, 19 R; 52/404, 410, 408, 406

[56] References Cited

U.S. PATENT DOCUMENTS

| | | | |
|---|---|---|---|
| 3,045,293 | 7/1962 | Potchen ................................ | 52/408 |
| 3,421,977 | 1/1969 | Hutchinson et al. ................. | 176/40 |
| 3,548,931 | 12/1970 | Germer et al. ....................... | 176/40 |
| 3,702,802 | 11/1972 | Jansen, Jr. ............................ | 176/38 |
| 3,776,814 | 12/1973 | Lockett et al. ....................... | 176/87 |
| 3,881,288 | 5/1975 | Fay ....................................... | 176/87 |
| 3,920,518 | 11/1975 | Brissaud et al. ...................... | 176/87 |
| 3,975,879 | 8/1976 | Birch et al. ........................... | 176/87 |
| 3,979,866 | 9/1976 | Prescott ................................ | 176/87 |
| 4,022,656 | 5/1977 | Durston et al. ....................... | 176/65 |
| 4,030,261 | 6/1977 | Coleman .............................. | 52/410 |
| 4,102,739 | 7/1978 | Sayre .............................. | 176/DIG. 2 |

FOREIGN PATENT DOCUMENTS

| | | | |
|---|---|---|---|
| 7316762 | 6/1974 | France ............................. | 176/DIG. 2 |
| 988412 | 4/1965 | United Kingdom .............. | 176/DIG. 2 |
| 1233537 | 5/1971 | United Kingdom .............. | 176/DIG. 2 |

*Primary Examiner*—Harvey E. Behrend
*Attorney, Agent, or Firm*—Larson, Taylor and Hinds

[57] ABSTRACT

The vault of a liquid metal cooled nuclear reactor is lined with thermal insulation. The insulation is in two layers, a first layer cladding the vault surface is of solid ceramic material while a second layer cladding the first layer is of fibrous or metallic material. In the event of a breach of the vessel leakage of liquid metal is absorbed by the second layer providing a conduction path to the first layer thereby enhancing heat loss to the concrete of the vault and maintaining the internal temperature at a safe limit.

5 Claims, 4 Drawing Figures

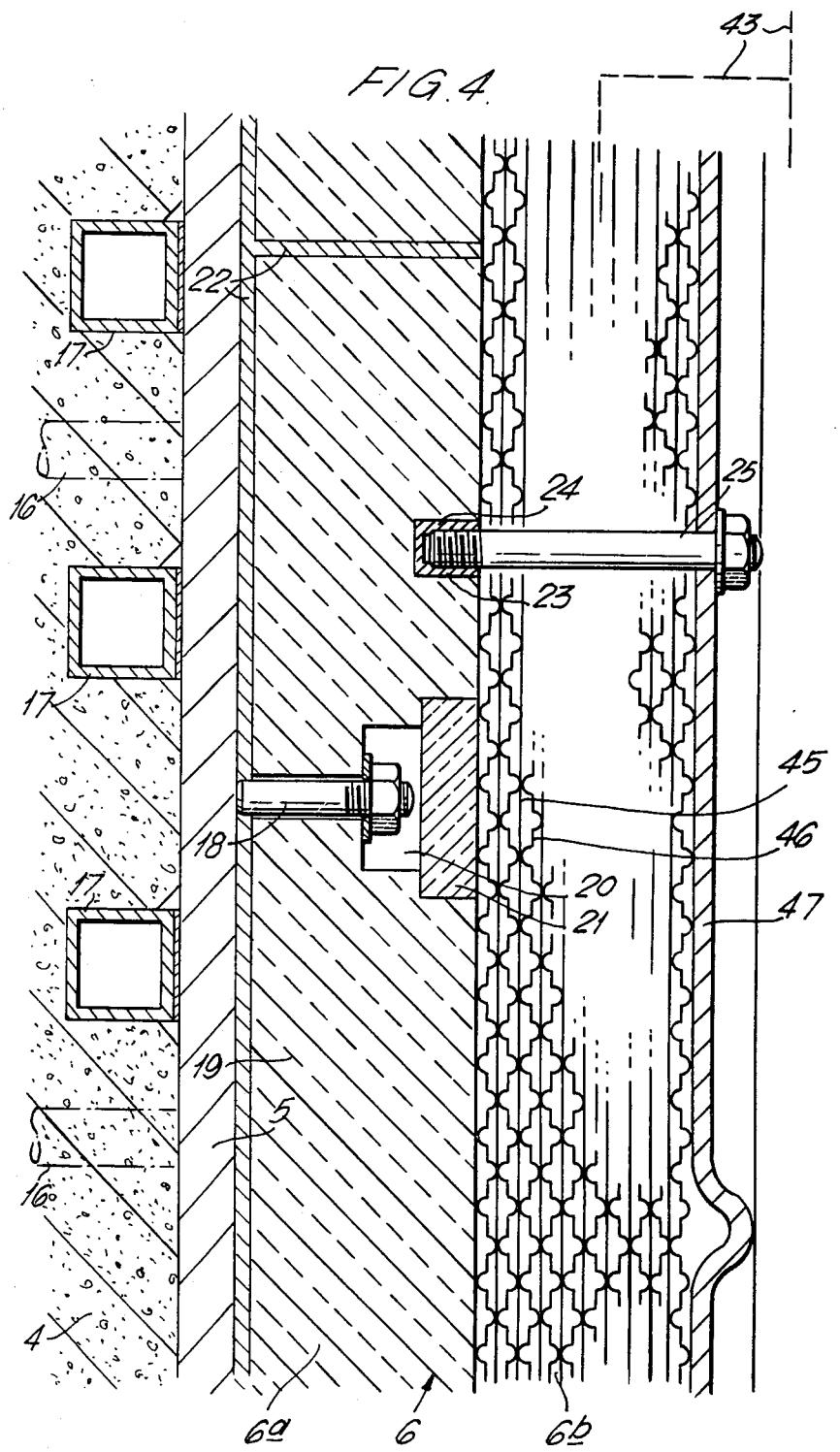

LIQUID METAL COOLED NUCLEAR REACTORS

BACKGROUND OF THE INVENTION

This invention relates to liquid metal cooled nuclear reactors.

A liquid metal cooled nuclear reactor is usually housed in a steel vessel which is itself enclosed within a steel lined concrete containment vault and in order to prevent damage to the concrete due to heat radiated from the nuclear reactor it is usual to interpose thermally insulating material between the reactor containing vessel and the vault lining. In one typical nuclear reactor construction known as a liquid metal cooled fast breeder nuclear reactor a fuel assembly is submerged in a pool of liquid sodium contained in a closed primary vessel and the primary vessel is suspended at its rim from the roof of a concrete containment vault having a membrane lining. The normal operating temperature of the primary vessel is approximately 400° C. so that thermally insulating material is required to reduce heat radiation to the concrete. In the event of an emergency such as a breach of the primary vessel resulting in loss of sodium from the pool the nuclear reactor is automatically shut down but nevertheless circumstances are envisaged wherein, due to decay heat generated in the fuel, the temperature of the sodium could rise to an excessively high value (approximately 650° C.) unless the excess heat is dissipated through the structure. Thus we have two conflicting requirements; thermally insulating material is required to reduce heat transfer to the concrete during normal operation of the reactor but, in the event of a breach of the primary vessel resulting in loss of coolant from the fuel assembly it must at least afford reduced heat insulation and preferably enhance heat transfer to the vault structure.

It is an object of the invention to provide a construction of liquid metal cooled nuclear reactor wherein a concrete containment vault is lined with thermal insulation to protect the vault against heat radiated from the reactor during normal operation of the reactor but wherein the efficiency of the heat insulation is reduced in an emergency to enable excessive heat from the reactor to be dissipated through the vault.

SUMMARY OF THE INVENTION

According to the invention in a liquid metal cooled nuclear reactor comprising a fuel assembly in a coolant containing primary vessel housed within a concrete containment vault and having thermally insulating material interposed between the vessel and the concrete, the thermally insulating material is of two layers, a first layer cladding the inner wall surface of the vault being generally impervious to liquid metal coolant whilst a second layer cladding the first layer is pervious to liquid metal coolant. In normal operation both layers of thermally insulating material serve to protect the concrete from heat radiated from the pool of high temperature coolant in the vessel but in the event of a breach of the vessel resulting in leakage of coolant, liquid metal permeates the second layer thus providing a vehicle for heat transfer by conduction through the second layer of insulating material and thereby reducing the overall insulating property of the two layers. The first layer, being generally impervious to liquid metal, protects the wall surface of the vault from substantially direct contact with the liquid metal.

The first layer of thermally insulating material may comprise ceramic bricks such as, for example, magnesia or alumina, and the second layer of thermally insulating material may be fibrous material such as, for example, glass or alumino-silicate, or gas pocket defining metallic sheets.

The invention will reside in a liquid metal cooled fast breeder nuclear reactor comprising a nuclear fuel assembly submerged in a pool of liquid metal coolant in a primary vessel having an open top and which is suspended from the roof structure of a concrete containment vault with a lining having cooling means, there being thermally insulating material disposed within an interspace between the vessel and the concrete, the thermally insulating material being of two layers, a first layer cladding the inner wall surface of the vault and which is generally impervious to liquid metal coolant, and a second layer cladding the first layer and which is generally pervious to liquid metal coolant, there being an impervious cover cladding the second layer of thermally insulating material and control means for flooding the second layer of thermally insulating material and the interspace bounded by the impervious cover and the primary vessel with liquid metal coolant to effect heat transfer between the primary vessel and the first layer of thermally insulating material.

In a preferred construction of liquid metal cooled fast breeder nuclear reactor the first layer of thermally insulating material comprises ceramic blocks of magnesium or alumina and the second layer of thermally insulting material comprises gas pocket defining metallic sheets.

A construction of nuclear reactor according to the invention has the advantage that during continued normal operation the concrete of the containment vault is not subject to deterioration due to excessive heat radiated from the nuclear fuel assembly but in the event of an emergency wherein excessive heat is radiated from the nuclear fuel assembly the heat concentration can be adequately moderated by heat transfer into the concrete and the cooling means.

DESCRIPTION OF THE DRAWINGS

Constructions of liquid metal cooled fast breeder nuclear reactor embodying the invention are described, by way of example, with reference to the accompanying drawings wherein:

FIG. 4 is a fragmentary sectional view of thermally insulating material used in the construction shown in FIG. 3.

DESCRIPTION OF THE PREFERRED EMBODIMENTS

Figure 1:
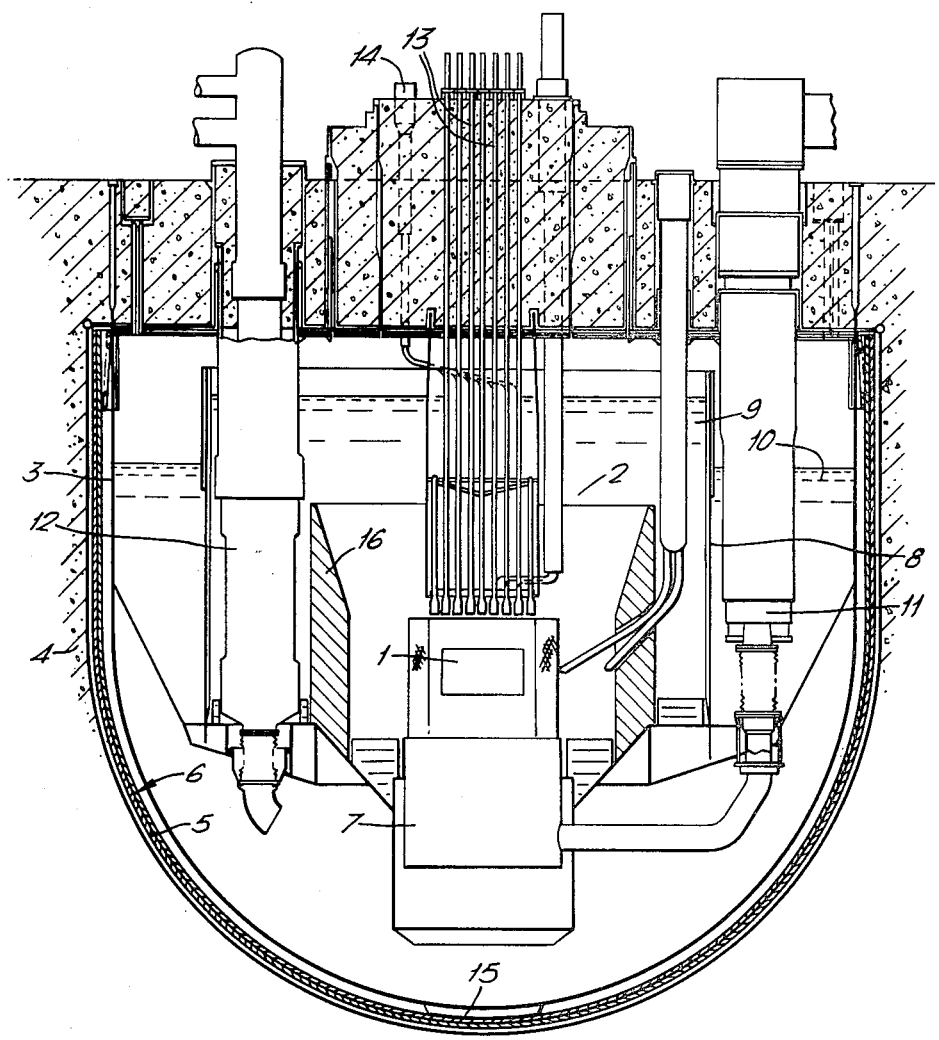
FIG. 1 is a sectional view of one construction.

The construction shown in FIG. 1 comprises a fuel assembly 1 submerged in a pool 2 of liquid metal (sodium) coolant contained by a primary vessel 3. The primary vessel is suspended at its rim from the roof of a concrete containment vault 4 which is lined with a steel membrane 5. The steel membrane is clad on its inner surface, that is, the surface directed towards the primary vessel, with thermally insulating material 6 to protect the concrete from heat radiated from the pool of liquid metal. The fuel assembly is carried on a diagrid 7 supported from the wall of the primary vessel 3 and is surrounded by a core tank 8 which divides the pool of coolant into inner and outer regions 9, 10. A pump 11 (one only being shown but of which, in fact, there are several) is arranged to pump coolant drawn from the outer region upwardly through the fuel assembly 1 by way of the diagrid 7 thence to a heat exchanger 12 (again only of several heat exchangers being shown) disposed in the inner region 9 of the pool of liquid metal. The heat exchanger 12 discharges liquid metal to the outer region 10, heat energy having been transferred from the coolant passing through the fuel assembly to a secondary coolant circulating through a secondary heat exchange circuit including the heat exchanger. Thus in operation of the nuclear reactor the outer region 10 contains relatively cold liquid metal at approximately 400° C. whilst the inner region 9 contains relatively hot liquid metal at approximately 600° C. The roof of the concrete vault 4 is penetrated by control rods 13 and instrumentation 14 connecting the fuel assembly with display and control apparatus outside the vault. In the base regions of the vault 4 there is a dished receptacle 15 for collecting (in the event of leakage) liquid metal running down the outer surface of the primary vessel and there is liquid metal detection means (not shown) associated with the receptacle for indicating the presence of liquid metal. The fuel assembly is surrounded by a neutron shield 16.

Figure 2:
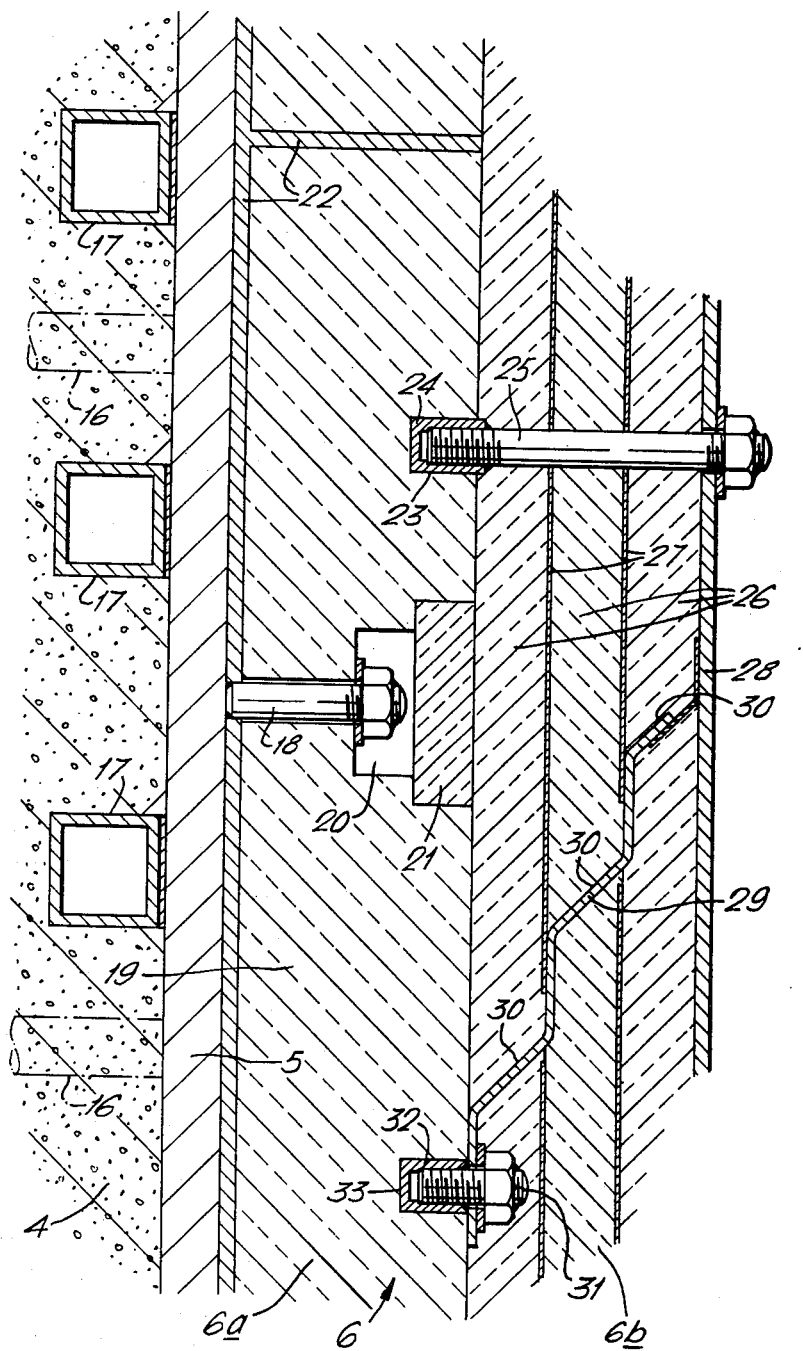
FIG. 2 is a fragmentary sectional view of thermally insulating material used in the construction shown in FIG. 1.

The thermally insulating material 6 is shown in greater detail in FIG. 2. The lining 5 of the vault is secured to the concrete by studs 16 shown in broken line and there are water conducting tubes 17 welded to the outer face of the lining 5 and embedded in the concrete. The thermally insulating material 6 is carried by a plurality of studs 18 welded to the steel lining. A first layer 6a of thermally insulating material cladding the lining comprises an array of ceramic bricks 19 or tiles which are impervious to liquid metal. The bricks are each penetrated by two studs 18 the complementary nuts being received in counterbores 20 closed by cover plate 21 of like ceramic material. The ceramic material of the described construction comprises magnesia but could also be of alumina and the bricks 19 are bedded and infilled with heat resisting cement 22. The bricks also have counterbores 23 which house screwed sockets 24 the sockets being engaged by studs 25 for supporting a second layer 6b of thermally insulating material. The second layer is of fibrous material which in this construction comprises glass but could equally well comprise alumino-silicate and is arranged in three sub-layers 26 with perforated membranes 27 interposed between the sublayers. The second layer 6b is protected by an array of perforated cover plates 28 carried by the studs 25 and arranged to clamp the material against the bricks 19. To prevent slumping of the vibrous material of the second layer 6b a plurality of upwardly inclined brackets 29 are provided, each bracket being arranged to be carried from the first layer of thermally insulating material and to penetrate the second layer. The brackets 29 are formed to provide lands 30 on which the sub-layers are supported and studs 31 for carrying the brackets 29 are again engaged with screwed sockets 32 which are received in counterbores 33 in the bricks.

In normal operation the temperature steps across the insulation are from approximately 350° C. at the cover plates 28 to 60° C. at the interface between the first and second layers to 45° C. at the lining. Heat is withdrawn from the lining by water flowing through the tubes 17 so that the operating temperature of the concrete is not sufficiently high to cause deterioration. However, the construction provides that in the event of a most unlikely emergency resulting in a severe breach of the primary vessel, leaking liquid metal will permeate the second layer of thermally insulating material thereby providing a vehicle for heat transfer by conduction to the first layer of thermally insulating material thereby reducing the overall insulating property of the layers. It is calculated that the temperature of the liquid metal in contact with the cover plates in such an emergency could be 650° C. and therefore a substantially similar temperature will obtain at the interfaces of the first and second layers whilst at the membrane lining the temperature will be at 200° C. the heat being dissipated by the coolant flowing through the tubes 17.

Figure 3:
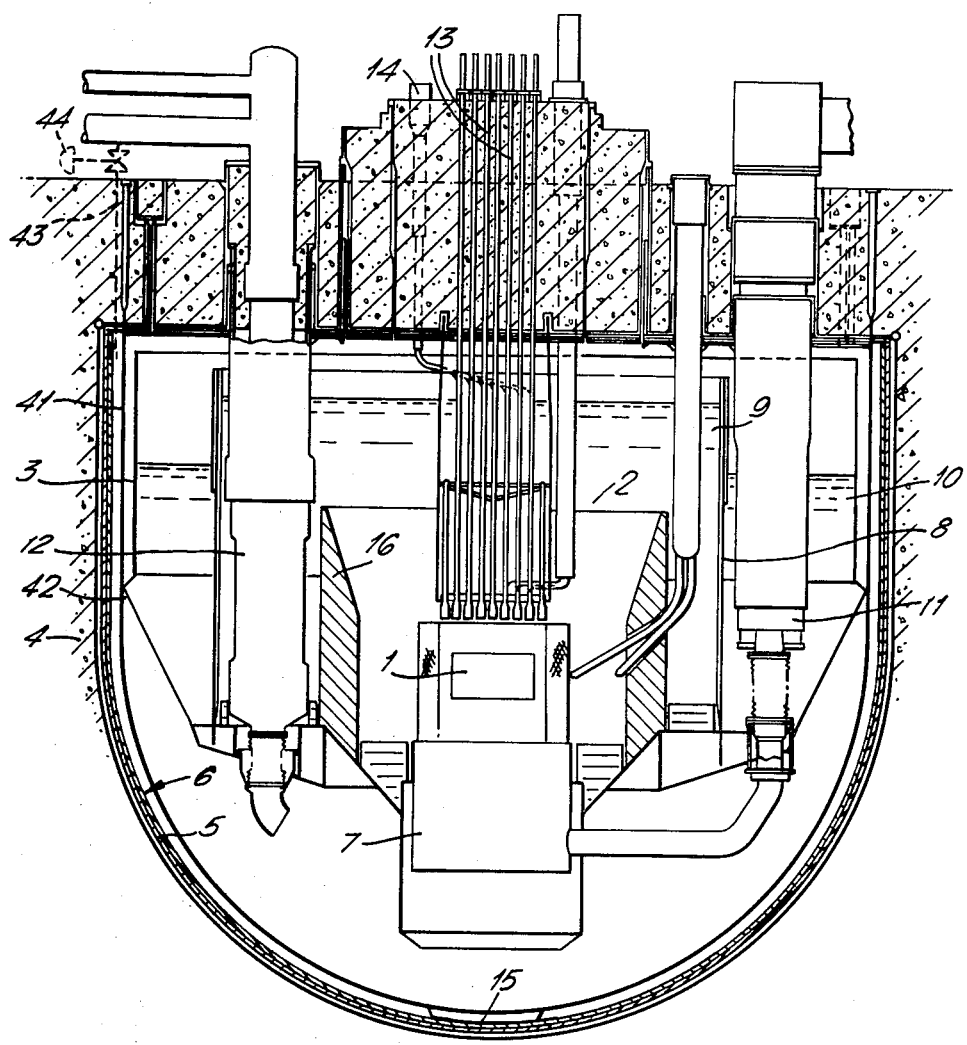
FIG. 3 is a sectional view of a second construction.

An alternative construction of liquid metal cooled fast breeder nuclear reactor shown in FIG. 3, is similar to that shown in FIG. 1 except that the primary vessel 3 is open at the top to avoid thermal stresses at the roof attachment and is supported from the roof structure of the vault 4 by an annular series of tie straps 41. The primary vessel incorporates a 'K' section annular yoke 42 the tie straps being attached to the upwardly directed leg of the section. The upwardly inclined leg and the downwardly directed vertical leg are each extended by the upper and lower strakes of the vessel respectively whilst the fuel assembly 1 is carried from the downwardly inclined leg.

In this construction there are provided pipe lines (one only being shown in broken line and designated 43 in FIG. 3) including normally closed control valves 44 connecting the secondary liquid metal coolant circuits to the interspace between the primary vessel and the wall of the concrete vault, the control valves being adapted to open on receipt of an emergency signal to flood the interspace with coolant. The vault contains a gaseous atmosphere (argon) providing a cover gas for the pool of coolant. The second layer of thermal insulation is of a conventional metallic foil kind which, in general, comprises a series of spaced stainless steel membranes 45 having dimpled spacer sheets 46 interposed therebetween as shown in FIG. 4. Heat transfer across the metallic sheets is inhibited by the gas interlayers formed therebetween. The second layer of insulation is protected by an impermeable cover 47 carried by stud bolts 25 in similar manner to the cover 28 of the first described construction the cover 47 of the second construction serving to protect the second layer of thermally insulating material from deposition of sodium vapour from the primary vessel. The cover 47 is ribbed in the vertical and horizontal directions to accommodate superficial thermal expansion.

In an emergency such as would cause the temperature of the coolant in the outer region of the pool of coolant in the primary vessel to rise excessively, the control valves are automatically opened to flood the interspace (including the second layer of thermally insulating medium) with secondary coolant, thereby providing a vehicle for conduction of heat to the first layer of insulation thence to the lined surface of the concrete vault where the heat can be withdrawn by the water coolant circuit comprising the tubes 17.

I claim:
1. A liquid metal cooled nuclear reactor comprising,
a concrete vault having a lining with cooling means
a primary vessel housed in the concrete vault and suspended from the roof structure of the vault, a nuclear fuel assembly submerged in a pool of liquid metal coolant contained by the primary vessel, a first layer of ceramic thermally insulating material cladding the inner wall surface of the vault, the first layer of thermally insulating material being impervious to liquid metal coolant, a second layer of thermally insulating material cladding the first layer of thermally insulating material, the second layer of thermally insulating material being pervious to liquid metal coolant.

2. A liquid metal cooled nuclear reactor according to claim 1 wherein the second layer of thermally insulating material is fibrous material.

3. A liquid metal cooled nuclear reactor according to claim 1 wherein the first layer of thermally insulating material comprises ceramic bricks of material selected from the group consisting of magnesium and alumina, and the second layer of thermally insulating material is selected from the group consisting of glass fibres, aluminosilicate fibres and gas pocket defining metallic sheets.

4. A liquid metal cooled fast breeder nuclear reactor comprising, a concrete vault having a lining with cooling means, a primary vessel housed in the concrete vault, the vessel having an open top and being suspended from the roof structure of the vault a nuclear fuel assembly submerged in a pool of liquid metal coolant contained by the primary vessel, a heat exchanger immersed in the pool of coolant and extending through the roof of the vault, the heat exchanger having primary and secondary liquid metal coolant circuits whereby primary coolant from the pool is circulated in heat exchange with secondary coolant circulating through steam raising plant disposed outside of the vault, a first layer of thermally insulating material cladding the inner wall surface of the vault, the first layer of thermally insulating material being impervious to liquid metal, a second layer of thermally insulating material cladding the first layer of thermally insulating material the second layer being pervious to liquid metal coolant, an impervious cover cladding the second layer of thermally insulated material and control means for flooding the second layer of thermally insulating material and the interspace bounded by the impervious cover and primary vessel with liquid metal coolant from the secondary circuit to effect heat transfer between the primary vessel and the first layer of thermally insulating material, 5. A liquid metal cooled fast breeder nuclear reactor according to claim 4 wherein the first layer of thermally insulating material comprises a ceramic material selected from the group consisting of magnesium and alumina and wherein the second layer of thermally insulating material comprises gas pocket defining metallic sheets.

* * * * *